Feb. 3, 1925.

G. DINCOGNITO

WELDING TOOL

Filed Oct. 18, 1923

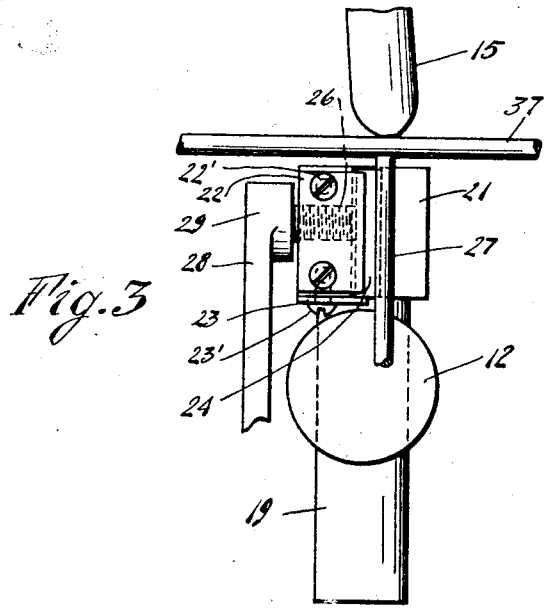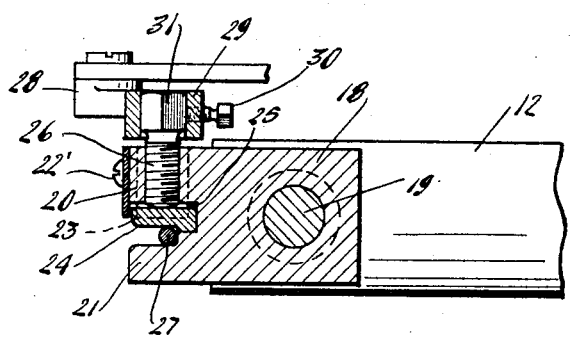

Patented Feb. 3, 1925.

1,525,277

UNITED STATES PATENT OFFICE.

GUY DINCOGNITO, OF CHICAGO, ILLINOIS.

WELDING TOOL.

Application filed October 18, 1923. Serial No. 669,257.

*To all whom it may concern:*

Be it known that I, GUY DINCOGNITO, a citizen of the United States, and a resident of the city of Chicago, county of Cook, and State of Illinois, have invented certain new and useful Improvements in Welding Tools, of which the following is a specification.

My invention relates to a new and improved welding tool, and more particularly to such a tool or attachment used with electric spot welding machines, and has for its main object to provide means for welding wires together to form T-butt joints.

Another object is to provide a welding tool with means for positively holding one wire in position so that the other wire can be held across the end of the first wire during the welding operation to produce a T-butt connection.

Other objects will appear hereinafter.

The invention consists in the combinations and arrangements of parts hereinafter described.

The invention will be best understood by reference to the accompanying drawings forming a part of this specification, and in which, Fig. 1 is an elevation showing my welding tool applied to an electric spot welding machine;

Fig. 3 is an enlarged front view thereof; and

Fig. 4 is an enlarged horizontal section taken on line 4—4 of Fig. 1.

Figure 1:
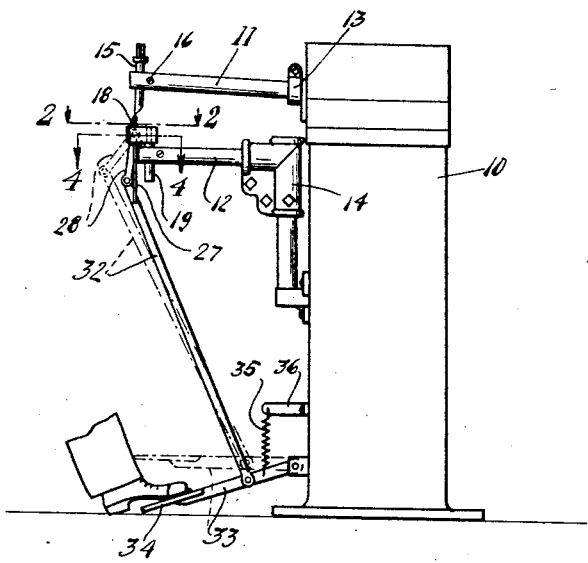
Figure 2:
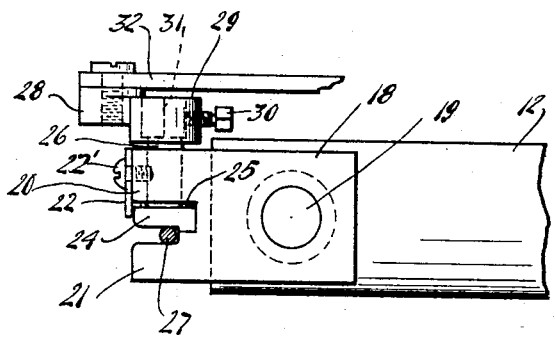
Fig. 2 is an enlarged plan view of the tool, taken along line 2—2 of Fig. 1.

In the drawings I have illustrated my invention in connection with a known type of electric spot welding machine 10 which is provided with arms 11 and 12 mounted thereon by means of brackets 13 and 14 and suitable bolts for clamping said arms in said brackets in their adjusted positions. The arms are provided with the usual welding coppers 15, adjustably mounted in knuckles at the forward ends of said arms and clamped in adjusted position therein by means of set screws 16 or the like.

Heretofore it has been customary with this type of machine, in welding wires for the production of wire lamp shade frames and similar wire goods, to hold the wires joined in cross relation between the points of the welding coppers, which would produce a thick, double joint undesirable in this class of goods. To overcome this defect I provide a novel welding tool with the use of which a neat and durable T-butt joint is produced, which could not be produced with the usual electric welding machine with the ordinary welding coppers, owing to the general arrangement of the elements of such machine.

The preferred form of my novel welding tool as illustrated comprises a block or body member 18 of material which is of high electric conductivity, as copper or the like, and which is provided with means for mounting it on one of the arms of said machine, said means preferably consisting of a stem 19 of similar electricity conducting material, which is preferably mounted in said block and is of a proper size to be mounted in the knuckle of one of said arms, preferably in the lower arm 12, in place of the removed welding copper. Jaws 20 and 21 are provided on block 18, the jaw 20 carrying front and bottom plates 22 and 23 detachably mounted thereon with screws 22' and 23' respectively, for retaining a clamping member or plate 24 movably located between said jaws in a depression or groove 25. An adjusting screw 26 is threaded through jaw 20 and engages plate 24 to force it inward and clamp the wire 27 between said plate and the jaw 21.

Means is provided for operating said adjusting screw and clamp plate, said means comprising a crank arm 28 having a boss 29 which is fastened with a set screw 30 on the head 31 of adjusting screw 26, for manually operating the clamp plate 24. Said arm is preferably pivoted to a link 32 connected to a pedal lever 33 which is pivoted to a machine 10 and carries a foot pedal 34 for operating the clamp plate to grip the wire, while a spring 35 is connected to said lever and to a lug 36 on the machine for actuating said lever to release the clamp plate. This lever 35 may also be arranged to control the electric current for operating the machine if desired.

In welding wires with the use of my improved welding tool, the stem 19 of the tool is mounted in the knuckle of one of the welding arms and said arm adjusted, then the wire 27 is clamped between members 21 and 24 by depressing pedal lever 33, so that a slight portion of said wire protrudes above the welding tool toward the point of the welding copper 15 adjusted in the other welding arm; the other wire 37 is then placed with its side across the end of wire 27 and immediately beneath the welding copper 15, as best shown in Fig. 3, and the current is turned on to weld these wires together to form a neat and durable T-butt joint.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. In a welding machine having arms extending substantially parallel therefrom for supporting welding coppers transversely in their ends, a welding tool having a stem mountable in place of one of said coppers, and means on said tool for clamping a wire parallel to said stem and to protrude toward the other welding copper and have its end welded against the side of another wire retained adjacent said other welding copper.

2. The combination, with an electric welding machine having adjustable arms carrying detachable welding coppers, of a welding tool having a stem mounted in place of one of said coppers, a jaw on said tool for holding a wire extending toward and alined with another welding copper to be welded into a T-butt joint with another wire retained adjacent said other copper, and means including a plate with an adjusting bolt for closing and opening said jaw.

3. The combination, with an electric welding machine having arms with means for adjustably retaining welding coppers, of a welding tool having a stem mounted in place of one of said coppers, a jaw on said tool for holding a wire with its end protruding toward another welding copper to be welded against the side of another wire adjacent said other copper, an adjustable clamping member in said jaw, and means actuated by a foot pedal for operating said clamping member.

4. A welding tool provided with means for mounting it on a welding machine, said tool comprising a jaw of high electric conductivity and arranged for receiving a wire, a movable clamping member mounted in said jaw for clamping the wire in position, a bolt threaded in one jaw for moving said clamping member and wire to the other jaw, and a foot actuated crank arm for operating said bolt.

5. A welding tool provided with means for mounting it on a welding machine, said tool being constructed of material of high electric conductivity and comprising a pair of jaws for receiving a wire, a clamping plate mounted against one of said jaws to clamp a wire between it and the other jaw, threaded means mounted through the first said jaw to actuate said clamping plate, a crank arm mounted on the head of said threaded means, and foot actuated means for operating said crank arm.

In testimony whereof I have signed my name to this specification in the presence of two subscribing witnesses.

GUY DINCOGNITO.

Witnesses:
 FREDA C. APPLETON,
 LOUISE SYNWALT.